United States Patent
Kode et al.

(10) Patent No.: US 11,641,408 B2
(45) Date of Patent: *May 2, 2023

(54) METHODS AND SYSTEMS OF CONFIGURING ELECTRONIC DEVICES

(71) Applicant: Google LLC, Mountain View, CA (US)

(72) Inventors: Ushasree Kode, Mountain View, CA (US); Nishit Shah, Mountain View, CA (US); Ibrahim Damlaj, Mountain View, CA (US); Michal Levin, Mountain View, CA (US); Thomas Weedon Hume, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,990

(22) Filed: Oct. 29, 2021

(65) Prior Publication Data
US 2022/0053060 A1 Feb. 17, 2022

Related U.S. Application Data

(63) Continuation of application No. 17/018,502, filed on Sep. 11, 2020, now Pat. No. 11,190,601, which is a
(Continued)

(51) Int. Cl.
*H04L 67/51* (2022.01)
*H04W 8/18* (2009.01)
(Continued)

(52) U.S. Cl.
CPC ............ *H04L 67/51* (2022.05); *H04L 67/306* (2013.01); *H04L 67/54* (2022.05); *H04W 4/70* (2018.02);
(Continued)

(58) Field of Classification Search
CPC ........... H04W 4/70; H04W 4/80; H04W 4/40; H04W 84/18; H04W 4/029; H04W 12/02;
(Continued)

(56) References Cited

U.S. PATENT DOCUMENTS

| | | | |
|---|---|---|---|
| 8,190,198 B1 | 5/2012 | Venkataramu | |
| 8,433,778 B1 * | 4/2013 | Shreesha | H04N 21/485 709/219 |

(Continued)

OTHER PUBLICATIONS

"Final Office Action", U.S. Appl. No. 15/049,384, dated Mar. 13, 2017, 10 pages.
(Continued)

*Primary Examiner* — Ajibola A Akinyemi
(74) *Attorney, Agent, or Firm* — McDonnell Boehnen Hulbert & Berghoff LLP (57) ABSTRACT

A system of configuring a new device may include a new device that is not configured with one or more settings. The new device includes a short range communication transmitter and programming instructions configured to cause the new device to operate in a discoverable mode. The system includes an existing device that is configured with the settings, and that includes a short range communication receiver and programming instructions. The programming instructions are configured to cause the existing device to receive instructions to set up the new device, in response to receiving the instructions, detect, by the short range communication receiver, a presence of the new device by detecting the broadcast signal within a communication range of the short range communication receiver, and in response to detecting the presence of the new device, transmit at least a portion of the one or more settings directly to the new device.

20 Claims, 6 Drawing Sheets

Related U.S. Application Data continuation of application No. 16/670,675, filed on Oct. 31, 2019, now Pat. No. 10,827,007, which is a continuation of application No. 15/049,384, filed on Feb. 22, 2016, now Pat. No. 10,511,957.

(51) Int. Cl.

| | | |
|---|---|---|
| *H04W 8/00* | (2009.01) | |
| *H04L 67/306* | (2022.01) | |
| *H04W 4/80* | (2018.01) | |
| *H04W 12/04* | (2021.01) | |
| *H04W 4/70* | (2018.01) | |
| *H04L 67/54* | (2022.01) | |

(52) U.S. Cl.
 CPC ............. *H04W 4/80* (2018.02); *H04W 8/005* (2013.01); *H04W 8/183* (2013.01); *H04W 12/04* (2013.01)

(58) Field of Classification Search
 CPC ....... H04W 4/021; H04W 4/024; H04W 4/38; H04W 40/244; H04W 8/005; H04W 88/16; H04W 4/02; H04W 4/48; H04W 48/04; H04W 76/15; H04W 8/22; H04W 12/033; H04W 4/027; H04W 12/50; H04W 28/22; H04W 4/025; H04W 64/006; H04W 88/02; H04W 28/18; H04W 4/026; H04W 4/10; H04W 52/283; H04W 52/367; H04W 56/001; H04W 56/0045; H04W 56/0095
 USPC ........................................................ 455/41.2
 See application file for complete search history.

(56) References Cited

U.S. PATENT DOCUMENTS

| | | | | |
|---|---|---|---|---|
| 8,938,519 | B1* | 1/2015 | Shreesha | H04N 21/4222 709/219 |
| 10,048,921 | B2* | 8/2018 | Raveendran | H04N 21/4122 |
| 10,511,957 | B2 | 12/2019 | Kode et al. | |
| 10,827,007 | B2 | 11/2020 | Kode et al. | |
| 11,190,601 | B2 | 11/2021 | Kode et al. | |
| 2008/0227440 | A1 | 9/2008 | Settepalli | |
| 2011/0074794 | A1* | 3/2011 | Felt | H04N 21/41265 345/520 |
| 2012/0246136 | A1* | 9/2012 | Moss | G06F 16/951 707/707 |
| 2013/0081121 | A1 | 3/2013 | Green et al. | |
| 2014/0032366 | A1* | 1/2014 | Spitz | G06Q 30/06 705/26.41 |
| 2014/0032635 | A1* | 1/2014 | Pimmel | H04N 21/44227 709/227 |
| 2016/0080041 | A1* | 3/2016 | Schultz | G08C 17/02 455/41.1 |
| 2016/0262155 | A1 | 9/2016 | Lindoff et al. | |
| 2017/0085938 | A1 | 3/2017 | Yeom et al. | |
| 2018/0084403 | A1 | 3/2018 | Kode et al. | |
| 2020/0068384 | A1 | 2/2020 | Kode et al. | |
| 2020/0412816 | A1 | 12/2020 | Kode et al. | |

OTHER PUBLICATIONS

"Final Office Action", U.S. Appl. No. 15/049,384, dated Apr. 29, 2019, 11 pages.
"Final Office Action", U.S. Appl. No. 15/049,384, dated May 11, 2018, 12 pages.
"Final Office Action", U.S. Appl. No. 15/049,384, dated Oct. 18, 2017, 11 pages.
"Non-Final Office Action", U.S. Appl. No. 16/670,675, dated Feb. 5, 2020, 9 Pages.
"Non-Final Office Action", U.S. Appl. No. 15/049,384, dated May 25, 2017, 10 pages.
"Non-Final Office Action", U.S. Appl. No. 15/049,384, dated Sep. 23, 2016, 9 pages.
"Non-Final Office Action", U.S. Appl. No. 15/049,384, dated Oct. 18, 2018, 10 pages.
"Non-Final Office Action", U.S. Appl. No. 15/049,384, dated Dec. 27, 2017, 11 pages.
"Notice of Allowance", U.S. Appl. No. 17/018,502, dated Jul. 20, 2021, 7 pages.
"Notice of Allowance", U.S. Appl. No. 16/670,675, dated Jul. 21, 2020, 7 Pages.
"Notice of Allowance", U.S. Appl. No. 15/049,384, dated Aug. 20, 2019, 9 Pages.

* cited by examiner

METHODS AND SYSTEMS OF CONFIGURING ELECTRONIC DEVICES

RELATED APPLICATIONS

This application is a continuation of U.S. patent application Ser. No. 17/018,502, filed on Sep. 11, 2020, which is a continuation of U.S. patent application Ser. No. 16/670,675, filed on Dec. 31, 2019, now U.S. Pat. No. 10,827,007, issued on Nov. 3, 2020, which in turn claims priority to U.S. patent application Ser. No. 15/049,384, filed on Feb. 22, 2016, now U.S. Pat. No. 10,511,957, issued on Dec. 17, 2019, the disclosures of which are incorporated by reference herein in their entireties.

BACKGROUND

Typically, a user can configure a device by providing a username, password, code and/or the like associated with a user account, or other settings to be associated with the device. In addition, it is possible to configure a device with a single tap and have all relevant data sent over a secure connection established as part of the tap gesture. However, this process relies on near-field communication capabilities of both devices. There are many situations where near-field communication is unreliable.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of configuring a new device may include a new device that is not configured with one or more settings. The new device includes a short range communication transmitter and programming instructions configured to cause the new device to operate in a discoverable mode by using the short range communication transmitter to broadcast a signal. The system includes an existing device that is configured with the one or more settings, and that includes a short range communication receiver and programming instructions. The programming instructions are configured to cause the existing device to receive, from a user, instructions to set up the new device, in response to receiving the instructions, detect, by the short range communication receiver, a presence of the new device by detecting the broadcast signal within a communication range of the short range communication receiver, and in response to detecting the presence of the new device, transmit at least a portion of the one or more settings directly to the new device. The portion of the one or more settings is configured to set up the new device without requiring provision of credentials of the user.

Optionally, a new device may be setup via an application resident on the existing device that is associated with the service provider. The application may be a search engine application.

In an embodiment, the instructions to setup a new device may include one or more typed instructions. Alternatively, the instructions to setup a new device may include one or more spoken instructions, and the existing device also includes a microphone configured to capture the spoken instructions.

The settings may include one or more of the following: the account credentials, one or more WiFi credentials, one or more applications resident on the existing device, data associated with the one or more applications, one or more settings of the existing device, and one or more user preferences. In an embodiment, the at least a portion of the one or more settings is further configured to setup the new device to have a similar configuration to a configuration of the existing device.

The existing device may include one or more programming instructions configured to cause the existing device to display the at least a portion of the one or more settings on a display device, and receive an indication from the user verifying that the at least a portion of the one or more settings be transmitted to the new device.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players, televisions, smart televisions, smart wearable devices and the like. Various elements of an example of a computing device or processor are described below in reference to FIG. 5.

An "existing device" refers to a device, such as a computing device, an electronic device, a programmable device or a networked device, that is configured with one or more settings.

A "setting" refers to a configuration associated with a device. A setting may be a user setting or a device setting. As another example, a setting may be a preference, an access privilege, a credential, an application, application data and/or the like. In certain embodiments, a setting may be associated with a user account such as, for instance, user account information, user account access information or credentials, and/or the like.

A "new device" refers to a device, such as a computing device, an electronic device, a programmable device or a networked device, that is to be configured using one or more settings of an existing device.

Figure 1:
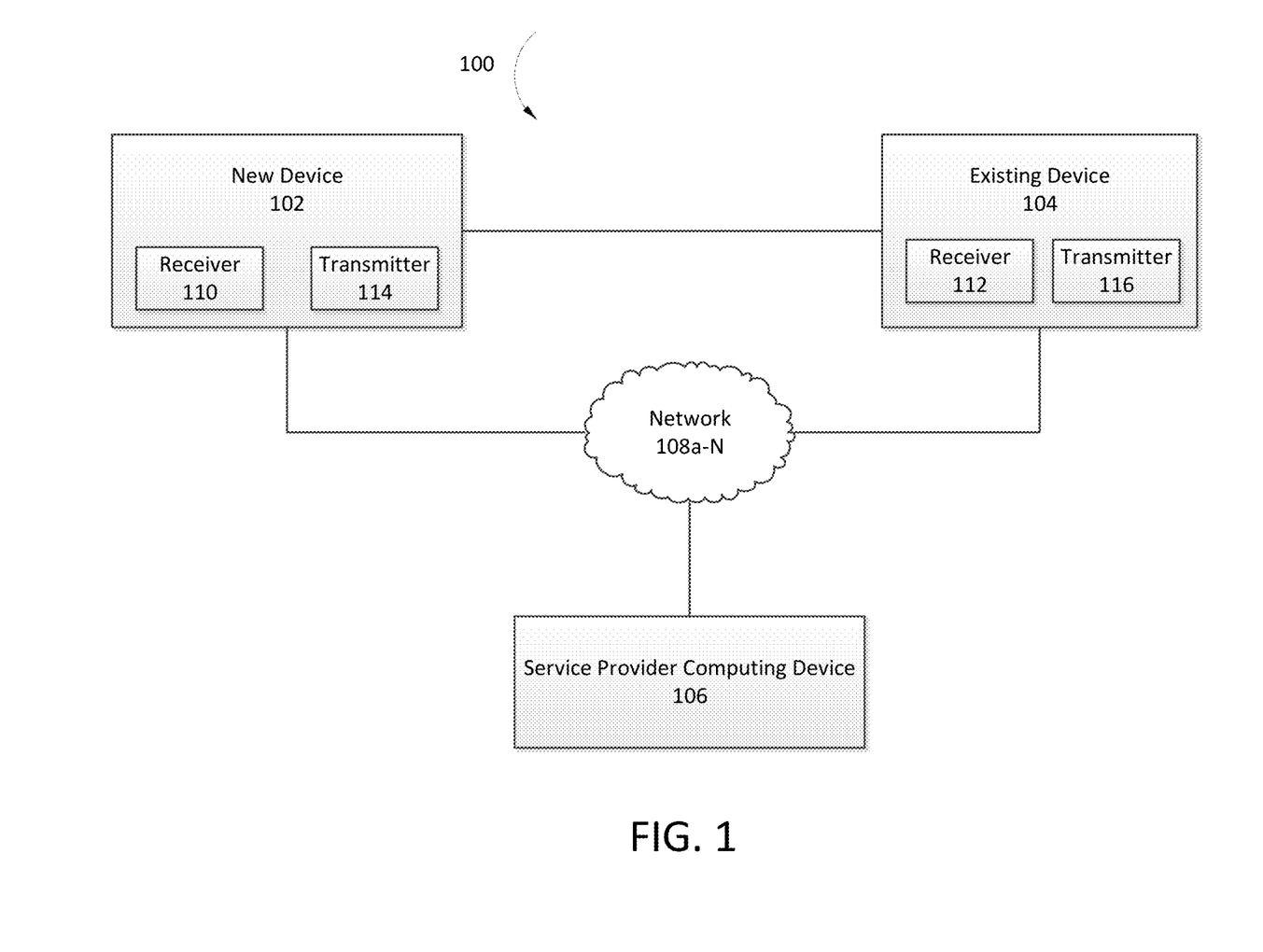
FIG. 1 illustrates an example system for configuring a new device according to an embodiment.

FIG. 1 illustrates an example system for configuring a new device according to an embodiment. As illustrated by FIG. 1, the system 100 may include a new device 102, an existing device 104, a service provider computing device 106 and one or more networks 108a-N. In an embodiment, an existing device 104 is a computing device of a user that is already configured with one or more settings. For example, an existing device may be a mobile phone that has already been configured with device and/or account settings.

In an embodiment, a new device 102 is a device that has not yet been configured with one or more settings. For example, a new device 102 may be a new device that a user has purchased or otherwise acquired. Examples of new devices 102 and/or existing devices 104 may include, without limitation, tablets, mobile phones, laptop computers, desktop computers, smart televisions, smart wearable devices and/or the like.

In an embodiment, a service provider electronic device 106 may be an electronic device associated with a service provider. Examples of a service provider electronic device 106 may include without limitation, a laptop computer, a desktop computer, a tablet, a mobile device, a server, a mainframe or other computing device.

As illustrated by FIG. 1, an existing device 104, a new device 102 and/or a service provider electronic device 106 may communicate with one another via one or more communication networks 108a-N. A communication network 108a-N may be a local area network (LAN), a wide area network (WAN), a mobile or cellular communication network, an extranet, an intranet, the Internet, a WiFi network and/or the like.

In various embodiments, an existing device 104 and a new device 102 may communicate via short range communication such as, for example, near field communication (NFC), radio frequency identification (RFID), Bluetooth and/or the like. A new device 102 and/or an existing device may include a short range communication receiver 110, 112 and/or transmitter 114, 116, such as, an RFID tag, a Bluetooth antenna, an NFC chip and/or the like.

In certain embodiments, an existing device 104 and/or a new device 102 may include a microphone and/or one or more speakers. An existing device 104 and/or a new device 102 may be configured to detect and respond to auditory or spoken commands. For instance, an existing device 104 may have a microphone that may capture one or more spoken commands of a user, and may translate the spoken commands into one or more actions.

Figure 2:
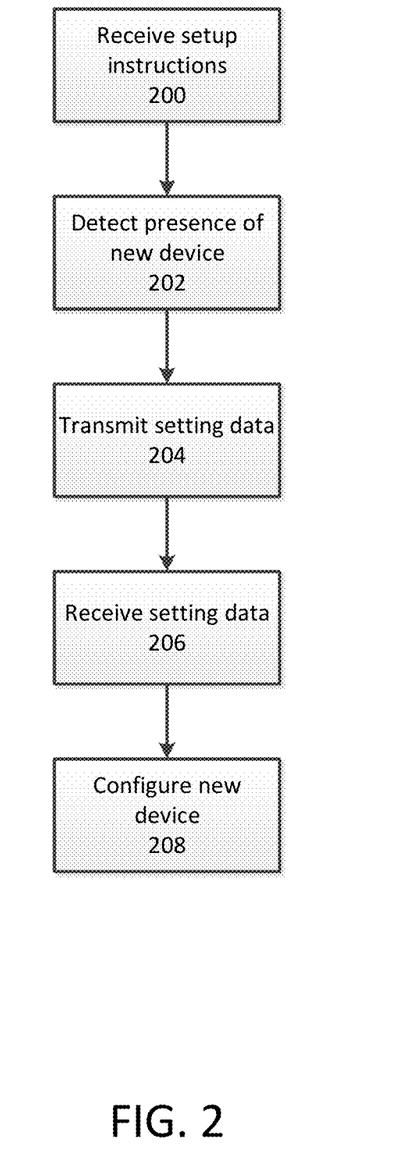
FIG. 2 illustrates a flow chart of configuring a new device according to an embodiment.

FIG. 2 illustrates a flow chart of an example method of configuring a new device according to an embodiment. As shown in FIG. 2, an existing device may receive 200, from a user, one or more setup instructions to configure a new device. In an embodiment, an existing device may receive 200 setup instructions via an application associated with an applicable service provider. In an embodiment, the application may reside on the existing device. For instance, an application may be one that is preloaded on an existing device, or one that a user downloads to the existing device. An example application may be a search engine application. In an embodiment, an application may be a web browser with the user signed in to a user account.

In an embodiment, a user may open an application on an existing device in order to provide setup instructions. In other embodiments, an application may run in the background or may not need to be opened in order to receive setup instructions.

Figure 3:
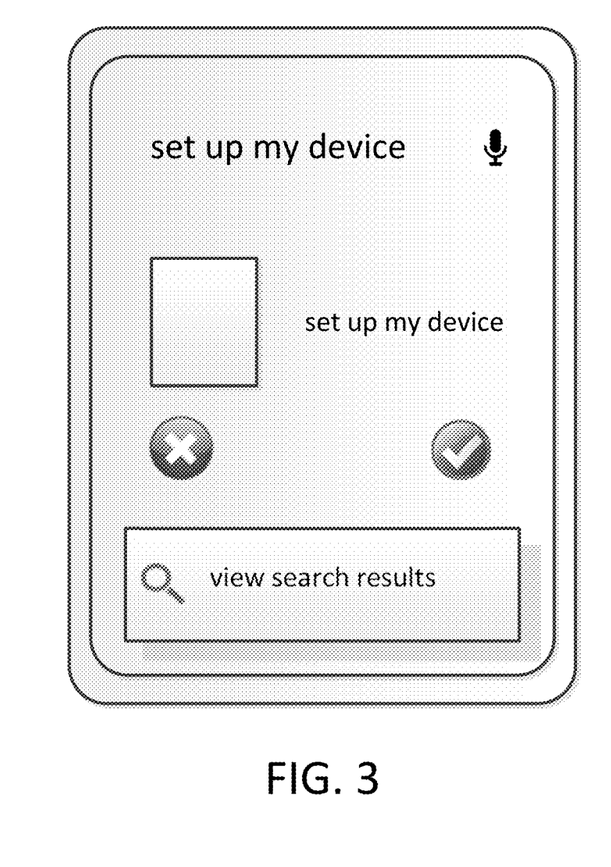
FIG. 3 illustrates an example graphical user interface according to an embodiment.

An existing device may receive 200 setup instructions that include one or more typed commands or one or more spoken commands. The commands may be the same regardless of how they are provided. For instance, providing the command "OK, set up my device" to an existing device may be used to trigger the configuration of a new device. This command may be spoken or typed. For instance, in the case of a spoken command, a microphone of an existing device may capture one or more commands that a user speaks using an application. In the case of typed commands, a user may provide a command to the existing device via an application. For instance, in the case of a search engine application, a user may type the command as a search query. FIG. 3 illustrates an example user interface showing a command that is entered into a search field of a search engine application according to an embodiment.

In response to receiving 200 the instructions, an existing device may detect 202 a presence of a new device that is to be set up. An existing device may detect 202 the presence of a new device using short range communication. For instance, a short range communication transmitter of a new device may broadcast a signal when the new device operates in a discoverable mode. A short range communication receiver of an existing device may detect the broadcast signal when it is broadcast within a communication range of the existing device's short range communication receiver.

Receiving 200 setup instructions from a user may trigger an existing device to scan for or otherwise try to detect the presence of a new device. Periodically or continuously scanning for the presence of proximate devices may drain the battery of the existing device. As such, an existing device may not begin scanning or trying to detect a new device until it receives setup instructions.

In an embodiment, in response to detecting 202 the presence of a new device, an existing device may transmit 204 setting data to the new device. In certain embodiments, an existing device may verify setting data before transmitting it to a new device. An existing device may verify setting data by causing at least a portion of the setting data to be displayed to a user, and asking a user to confirm that the displayed setting data is to be transmitted to a new device.

Setting data may refer to information pertaining to one or more settings of an existing device. For instance, setting data may include information about a user account of an existing device, such as, for example, account credentials. As another example, setting data may include device settings of an existing device, such as, for example, WiFi credentials, location, language, date, time, time zone and device configurations. For instance, setting data may include information about a visual layout of one or more applications on the existing device.

As another example, setting data may include applications present on the existing device, data associated with applications present on the existing device, and/or user preferences.

In various embodiments, an existing device may transmit applications and application data itself, or an indication of one or more applications, such as an application name, unique identifier and/or the like. For instance, an existing device may transmit binary data such as an Android application package. If an existing device transmits an indication of an application to a new device, the new device may use the indication to obtain the corresponding application. For instance, a new device may use the indication to automatically download the corresponding application to the new device.

Figure 4A:
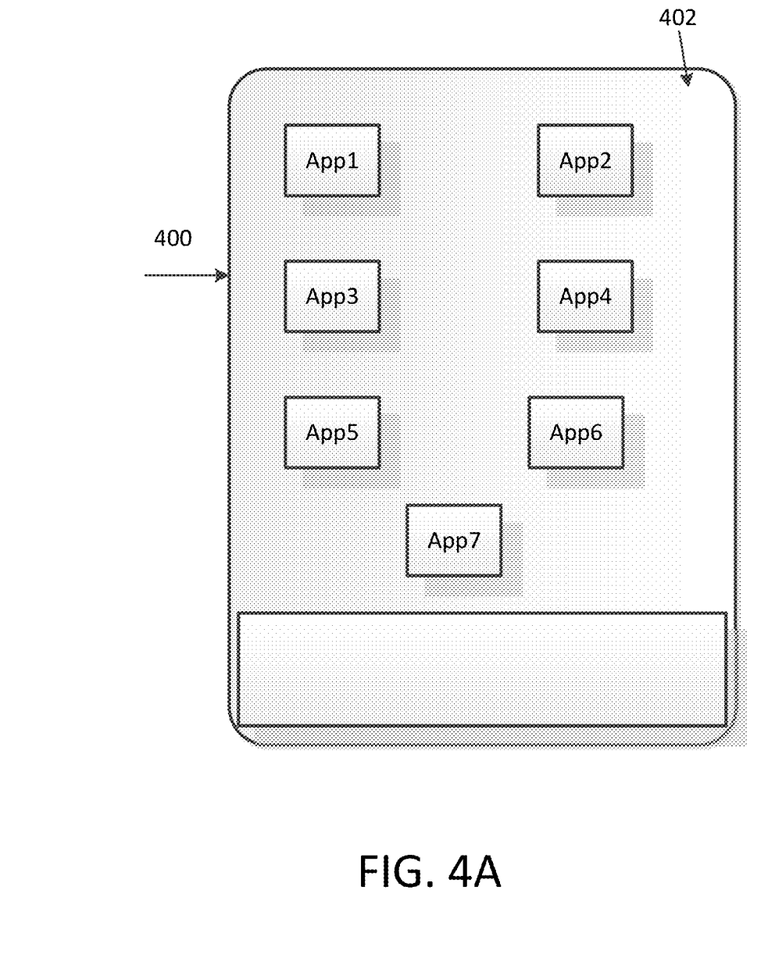
FIGS. 4A and 4B illustrate example device configurations according to various embodiments.
Figure 4B:
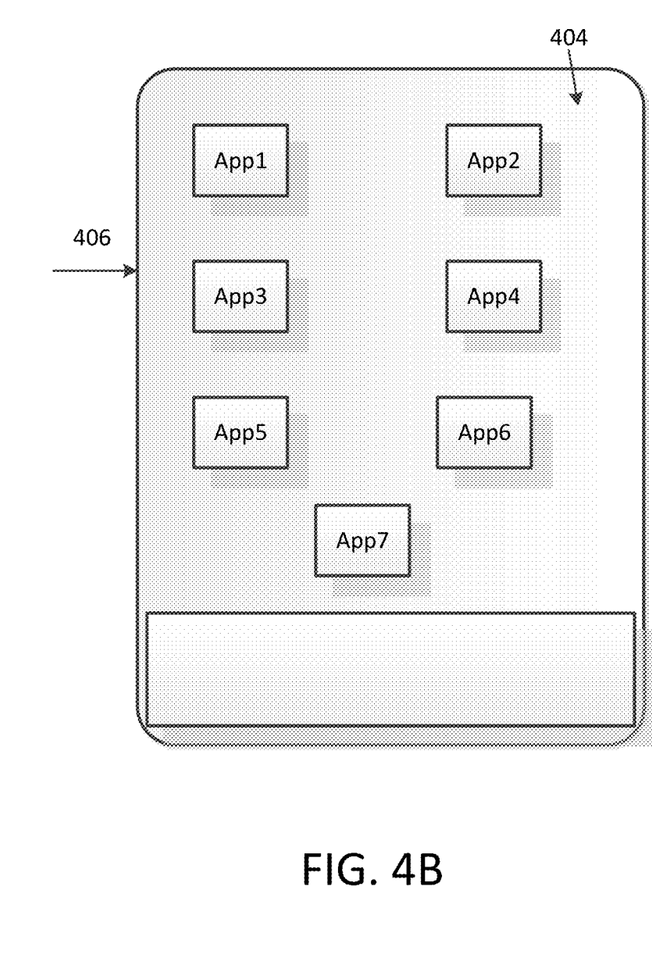

An existing device may transmit 204 setting data to a new device using short range communication. As such, an existing device may transmit 204 setting data directly to a new device without using a service provider electronic device as an intermediary. The new device may receive 206 the setting data, and may use the received setting data to configure 208 itself For instance, a new device may configure itself in accordance with the received setting data. The new device may configure itself to have a substantially similar setting configuration to that of the existing device. For instance, the new device may include the same applications, the same visual layout, the same settings or configurations of the existing device or one or more applications of the existing device and/or the like. For instance, FIG. 4A illustrates an example configuration of a home screen 402 of an existing mobile device 400 according to an embodiment. FIG. 4B illustrates an example configuration of a home screen 404 of a new mobile device 406 that is setup via the existing mobile device. As shown by FIGS. 4A and 4B, the configuration of both devices is substantially the same.

As another example, setting data may include WiFi credentials. An existing device may detect 202 the presence of a new device, and may transmit 204 the WiFi credentials associated with the existing device to the new device. The new device may use the received WiFi credentials to automatically configure its wireless network connection. As another example, if the setting data includes a geographic location, time, language, date, and time zone, the new device may configure its settings to reflect the received geographic location, time, language, date and time zone. Additional and/or alternate setting data may be used within the scope of this disclosure.

In various embodiments, if the setting data that is being transmitted from an existing device is associated with a user account, a user may be asked to verify one or more credentials associated with the user account before the setting data is transmitted. For instance, a user may log into a user account associated with a service provider using an existing device by providing one or more account credentials such as a username and password. The existing device may receive the account credentials, and may verify the account credentials. For instance, the existing device may transmit the provided account credentials to a service provider electronic device, and may receive from the service provider electronic device an indication of whether the account credentials are valid. In response to validating the account credentials, the existing device may begin transmitting setting data to a new device.

The following provide examples of the configuration approach described above. In an embodiment, a user has her existing mobile phone and wants to set up a new mobile device that is the newest model. The new mobile device may become discoverable while in a setup wizard. However, the existing mobile device needs to know when to start scanning for the new mobile device's presence since scanning drains the battery of the existing mobile device. A user may speak "OK, set up my device" to trigger the existing mobile device to begin scanning for the new mobile device. The existing mobile device may locate the new mobile device and may transmit account data to the new mobile device. As such, the user is not required to provide her account credentials to the new mobile device, and the new mobile device may be automatically setup to have the same data configuration as the existing mobile device.

Figure 5:
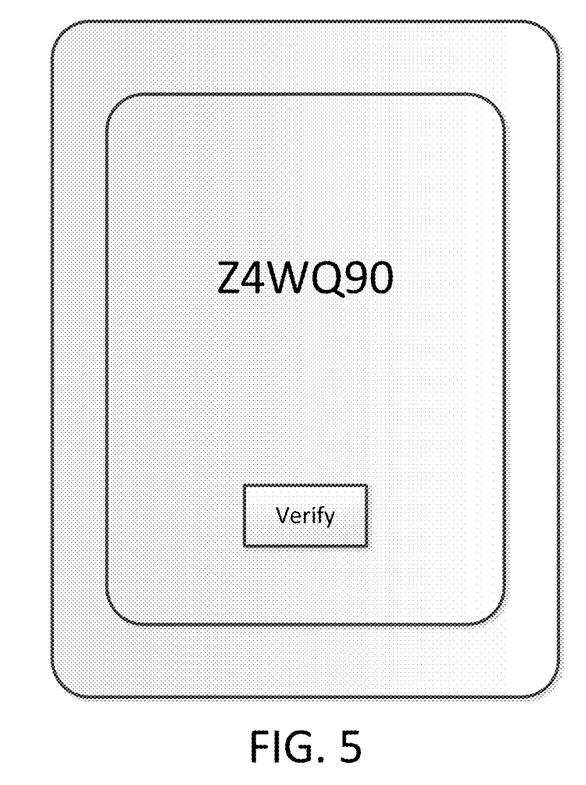
FIG. 5 illustrates an example screen shot showing a mobile device requesting verification of WiFi credentials according to an embodiment.

As another example, a user may use her existing mobile device associated with a service provider to configure a new television that is also associated with the service provider. The television may support a smart setup process for those who already have a device that is associated with the service provider. Once this setup process begins, the television becomes discoverable and the user provides her existing mobile device with a setup instruction by typing "OK, set up my device" into a search engine application on the existing mobile device. In response to receiving this instruction, the mobile device detects the television, and causes the WiFi credentials associated with the mobile device to be displayed to the user on the existing device for verification. FIG. 5 illustrates an example screen shot showing a mobile device requesting verification of WiFi credentials according to an embodiment. As shown by FIG. 5, the mobile device causes the WiFi credentials to be displayed to a user on a display interface, and prompts the user to verify whether the WiFi credentials should be sent to the television. If the user indicates that the WiFi credentials should be sent, the mobile device transmits WiFi credentials to the television. The television uses this information to configure itself For example, the television uses the received WiFi credentials to connect to the associated WiFi network. If the user indicates that the WiFi credentials should not be sent, the mobile device will not transfer the WiFi credentials.

As another example, a user may setup a new smart home device using a mobile device. A smart home device may be an iOT-based device such as, for instance, a smart light bulb that can be programmatically switched on or off from another device. As a headless device without any display, a smart light bulb needs to be setup manually through a companion application. But this capability can be embedded in the common operating system. The user may power on the light bulb and may provide setup instructions in its instruction manual to the mobile device by speaking the command, "OK, set up my device." This setup instruction may cause the mobile device to transfer WiFi credentials and/or other settings to the smart light bulb, and thus configure the light bulb to communicate with the mobile device.

Figure 6:
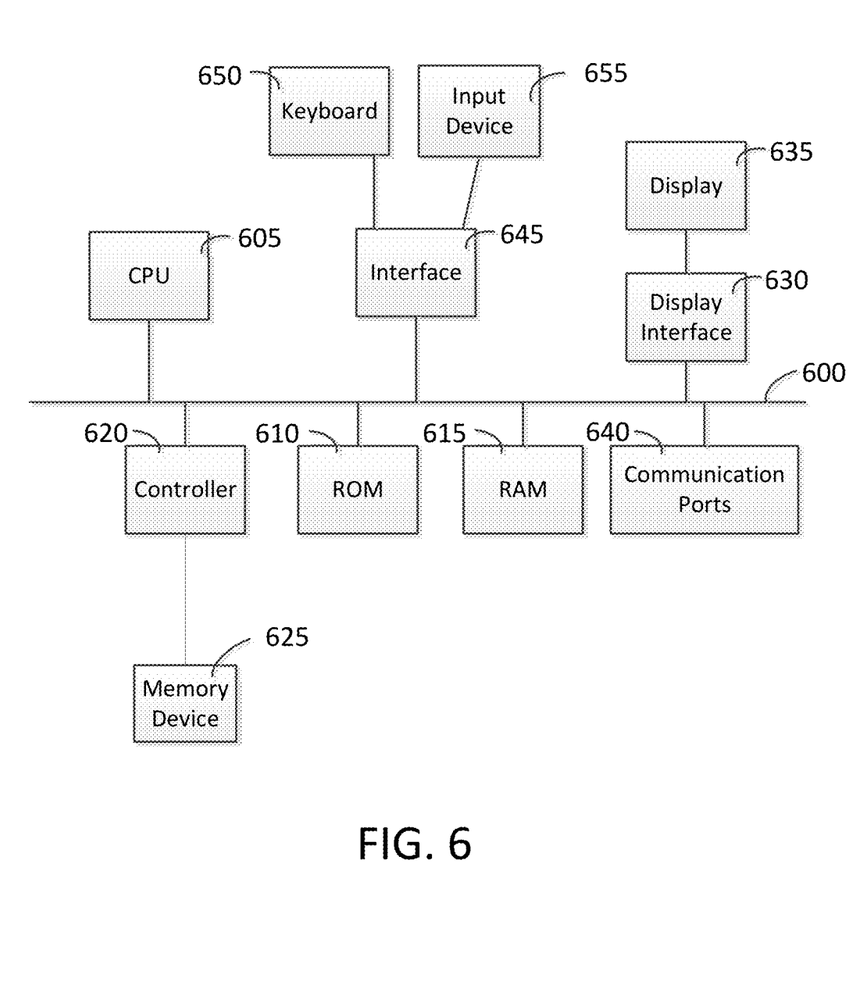
FIG. 6 illustrates a block diagram of example hardware that may be used to contain or implement program instructions according to an embodiment.

FIG. 6 depicts a block diagram of an example of internal hardware that may be used to contain or implement program instructions, such as the process steps discussed above, according to embodiments. A bus 600 serves as an information highway interconnecting the other illustrated components of the hardware. CPU 605 represents one or more processors of the system, performing calculations and logic operations required to execute a program. CPU 605, alone or in conjunction with one or more of the other elements disclosed in FIG. 6, is an example of a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium 625 such as a compact disk, a digital disk, flash memory, a memory card, a USB drive, an optical disc storage medium, such as a Blu-ray™ disc, and/or other recording medium controlled via a disk controller 620.

An optional display interface 630 may permit information from the bus 600 to be displayed on the display 635 in audio, visual, graphic or alphanumeric format. Communication with external devices, such as a printing device, may occur using various communication ports 650. A communication port 650 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of configuring a new device, the method comprising:
   receiving, by an existing device that is configured with one or more settings, one or more instructions configured to set up a new device that has not yet been configured with the one or more settings of the existing device, the one or more settings corresponding to an existing wireless network connection between the existing device and a service provider electronic device;
   in response to receiving the one or more instructions, scanning for and detecting, by a wireless communication receiver of the existing device, a presence of the new device, the presence of the new device detected by detecting a broadcast signal transmitted by the new device within a wireless communication range of the wireless communication receiver; and
   after detecting the presence of the new device, transmitting, by the existing device directly to the new device without using the service provider electronic device as an intermediary, the one or more settings of the existing device that correspond to the existing wireless network connection between the existing device and the service provider electronic device, the transmitting directly to the new device to enable the new device to automatically configure itself and a new wireless network connection between the new device and the service provider electronic device with the same one or more settings as the existing device without requiring a user to provide the one or more settings to the new device.

2. The method of claim 1, wherein the instructions to set up the new device comprise one or more typed instructions.

3. The method of claim 1, wherein:
   the instructions to set up the new device comprise one or more spoken instructions; and
   the existing device further comprises a microphone configured to capture the spoken instructions.

4. The method of claim 1, further comprising:
   causing the at least a portion of the one or more settings to be displayed by the existing device; and
   receiving, by the existing device, an indication from the user verifying that the at least a portion of the one or more settings are to be transmitted to the new device.

5. The method of claim 1, further comprising:
   transmitting, to the service provider electronic device using the existing wireless network connection, a request for validation for the one or more settings; and
   receiving, from the service provider electronic device using the existing wireless network connection, validation of the transmitted one or more settings,
   wherein transmitting the one or more settings directly to the new device without using the service provider electronic device as an intermediary comprises transmitting the validated one or more settings.

6. The method of claim 1, wherein:
   the one or more settings include one or more device configurations of the existing device; and
   the method further comprises, after detecting the presence of the new device, transmitting, directly to the new device, at least a portion of the one or more device configurations of the existing device including at least one of one or more applications present on the existing device, application data associated with the one or more applications, or user preferences associated with the one or more applications.

7. The method of claim 1, wherein the wireless communication link comprises a short range communication link.

8. A computing device comprising:
   one or more settings associated with an existing wireless network connection between the computing device and a service provider electronic device;
   a wireless communication receiver configured to receive signals; and
   programming instructions configured to cause the computing device to:
      receive instructions to set up a new device that is not configured with the one or more settings;
      in response to receiving the instructions, scan for and detect, by the wireless communication receiver, a presence of the new device by detecting a broadcast signal within a wireless communication range of the wireless communication receiver, the broadcast signal originating from the new device; and
      after detecting the presence of the new device, transmit setting data pertaining to the one or more settings directly to the new device to cause the new device to automatically configure a new wireless network connection to the service provider electronic device using the one or more settings associated with the existing wireless network connection between the computing device and the service provider electronic device.

9. The computing device of claim 8, wherein the instructions to set up the new device comprise one or more typed instructions.

10. The computing device of claim 8, wherein:
the instructions to set up the new device comprise one or more spoken instructions; and
the computing device further comprises a microphone configured to capture the spoken instructions.

11. The computing device of claim 8, further comprising one or more programming instructions configured to cause the computing device to:
display the at least a portion of the one or more settings on a display device; and
receive an indication from the user verifying that the at least a portion of the one or more settings be transmitted to the new device.

12. The computing device of claim 8, wherein the programming instructions are further configured to cause the computing device to:
transmit, to a service provider electronic device using the existing wireless network connection, a request for validation for the at least a portion of the setting data; and
receive, from the service provider electronic device using the existing wireless network connection, validation of the transmitted setting data,
wherein transmitting the setting data directly to the new device via the wireless communication link comprises transmitting the validated setting data.

13. The computing device of claim 8, wherein:
the one or more settings include one or more device configurations of the computing device; and
the programming instructions are further configured to cause the computing device to, after detecting the presence of the new device, transmit, directly to the new device via the wireless communication link, at least a portion of the one or more device configurations of the computing device including at least one of one or more applications present on the computing device, application data associated with the one or more applications, or user preferences associated with the one or more applications.

14. The computing device of claim 8, wherein the wireless communication link includes a short range communication link.

15. A non-transitory computer-readable storage media comprising instructions that, when executed, configure at least one processor of an existing device to:
receive a command to set up a new device that has not yet been configured with one or more settings of the existing device, the one or more settings comprising corresponding to an existing wireless network connection between the existing device and a service provider electronic device;
in response to receipt of the command, cause a wireless communication receiver of the existing device to scan for and detect a presence of the new device, the presence of the new device detected based on a broadcast signal transmitted by the new device within a wireless communication range of the wireless communication receiver; and
after detection of the presence of the new device, transmit, via a wireless communication link, the one or more settings of the existing device that correspond to the existing wireless network connection between the existing device and the service provider electronic device directly to the new device to enable the new device to automatically configure itself and a new wireless network connection between the new device and the service provider electronic device with the same one or more settings as the existing device without requiring a user to provide the one or more settings to the new device.

16. The non-transitory computer-readable storage media of claim 15, wherein the command to set up the new device comprise one or more typed commands input by a user.

17. The non-transitory computer-readable storage media of claim 15, wherein:
the command to set up the new device comprise one or more spoken commands, and
the existing device further comprises a microphone configured to capture the spoken commands.

18. The non-transitory computer-readable storage media of claim 15, wherein the instructions further configure the at least one processor to:
cause the at least a portion of the one or more settings to be displayed by the existing device; and
receive an indication from the user verifying that the at least a portion of the one or more settings be transmitted to the new device.

19. The non-transitory computer-readable storage media of claim 15, wherein the instructions further configure the at least one processor to:
transmit, to a service provider electronic device using the existing wireless network connection, a request for validation for the one or more settings; and
receive, from the service provider electronic device using the existing wireless network connection, validation of the transmitted one or more settings,
wherein transmission of the one or more settings directly to the new device via the wireless communication link comprises transmission of the validated setting data.

20. The non-transitory computer-readable storage media of claim 15, wherein:
the one or more settings include one or more device configurations of the existing device; and
the instructions further configure the at least one processor to, in response to the detection of the presence of the new device, transmit, directly to the new device via the wireless communication link, at least a portion of the one or more device configurations including at least one of one or more applications present on the existing device, application data associated with the one or more applications, or user preferences associated with the one or more applications.

* * * * *